United States Patent
Feldman et al.

(10) Patent No.: US 10,817,238 B2
(45) Date of Patent: Oct. 27, 2020

(54) SYSTEMS AND METHODS FOR DETERMINING APPLICATION AVAILABILITY

(71) Applicant: Ford Global Technologies, LLC, Dearborn, MI (US)

(72) Inventors: Casey Bryan Feldman, Sunnyvale, CA (US); Doron M Elliott, Detroit, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 573 days.

(21) Appl. No.: 15/098,010

(22) Filed: Apr. 13, 2016

(65) Prior Publication Data

US 2017/0300281 A1    Oct. 19, 2017

(51) Int. Cl.
| | |
|---|---|
| *G06F 3/14* | (2006.01) |
| *H04L 29/08* | (2006.01) |
| *B60K 35/00* | (2006.01) |
| *H04B 1/3822* | (2015.01) |

(52) U.S. Cl.
CPC ............ *G06F 3/1423* (2013.01); *B60K 35/00* (2013.01); *G06F 3/1462* (2013.01); *H04B 1/3822* (2013.01); *H04L 67/12* (2013.01); *H04L 67/34* (2013.01); *B60K 2370/11* (2019.05); *B60K 2370/52* (2019.05); *B60K 2370/563* (2019.05)

(58) Field of Classification Search
CPC combination set(s) only.
See application file for complete search history.

(56) References Cited

U.S. PATENT DOCUMENTS

| | | | |
|---|---|---|---|
| 8,942,888 B2 | 1/2015 | Garrett | |
| 2013/0086518 A1 | 4/2013 | Park | |
| 2015/0193093 A1 | 7/2015 | Grover | |
| 2016/0034238 A1* | 2/2016 | Gerlach | G06F 3/04817 345/1.1 |
| 2017/0115828 A1* | 4/2017 | Langlois | G06F 3/0481 |

OTHER PUBLICATIONS

Using your device with a car infotainment system—Sony Xperia™ Z5 Compact support (United Kingdom), Jan. 12, 2016.
international Journal on Recent and innovation Trends in Computing and Communication, vol. 3 Issue: 5, Smart Connectivity for Automotive Head Unit.

* cited by examiner

Primary Examiner — William Boddie
Assistant Examiner — Alecia D English
(74) *Attorney, Agent, or Firm* — David R. Stevens; Stevens Law Group

(57) ABSTRACT

Example systems and methods for determining application availability are described. In one implementation, a vehicle entertainment system establishes a communication link with a mobile device near the vehicle. The vehicle entertainment system receives, from the mobile device, an identification of currently available applications on the mobile device. The vehicle entertainment system also updates an in-vehicle user interface to display the currently available applications on the mobile device to at least one occupant of the vehicle.

18 Claims, 5 Drawing Sheets

SYSTEMS AND METHODS FOR DETERMINING APPLICATION AVAILABILITY

TECHNICAL FIELD

The present disclosure relates to systems and methods that determine currently available applications in a mobile device.

BACKGROUND

Many vehicles include vehicle entertainment systems, navigation systems, infotainment systems, and the like. Some of these systems can interact with mobile devices carried by a user (e.g., a driver or passenger of the vehicle). In some situations, a vehicle entertainment system may communicate with a mobile device and allow a user to control certain features of the mobile device through the vehicle entertainment system. To properly support such control of mobile device features, it is important for the vehicle entertainment system to understand the specific features available in the mobile device.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
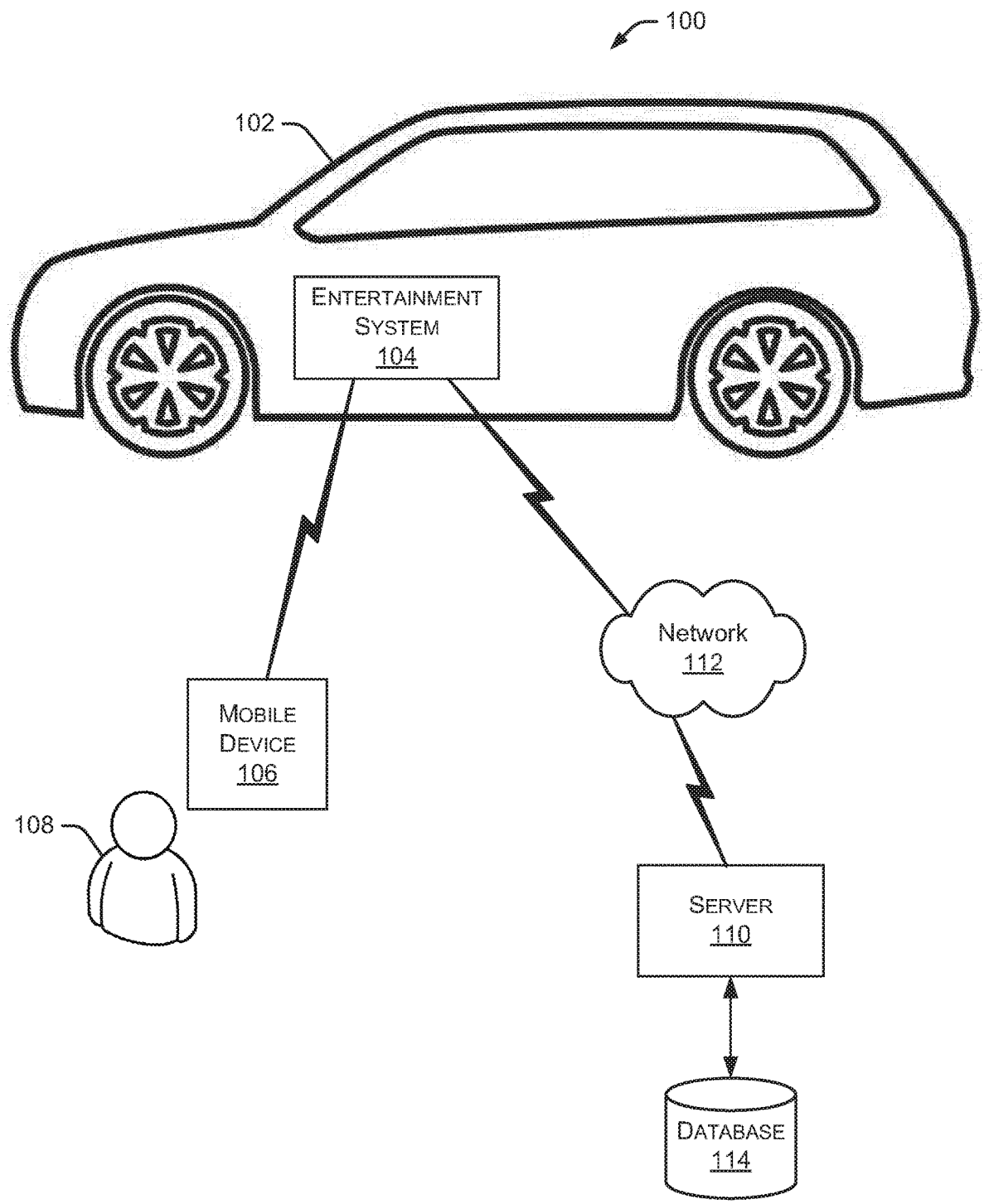
FIG. 1 is a block diagram depicting an example environment capable of implementing the systems and methods discussed herein.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Particular examples discussed herein refer to determining currently available applications on a mobile device and updating a user interface of a vehicle entertainment system based on the currently available applications. Although the particular examples refer to a vehicle entertainment system, the described systems and methods are applicable to any type of vehicle system, such as infotainment systems, navigation systems, vehicle control systems, and the like. Additionally, in some embodiments, the vehicle entertainment system interacts with multiple mobile devices and determines currently available applications on all of the multiple mobile devices. All of the currently available applications (across all mobile devices) are displayed on a user interface of the vehicle entertainment system.

As used herein, a vehicle includes a car, truck, bus, van, motorcycle, scooter, bicycle, and the like. Particular examples discussed herein refer to use of a Bluetooth wireless communication system. However, the described systems and methods are applicable to any type of wireless communication system using any communication protocol or messaging system.

FIG. 1 is a block diagram depicting an example environment 100 capable of implementing the systems and methods discussed herein. A vehicle 102 includes an entertainment system 104 that provides various entertainment, navigation information, and other data to the occupants of vehicle 102. Although entertainment system 104 is illustrated as a single component, in alternate embodiments, entertainment system 104 may include multiple separate components or modules located within vehicle 102.

Entertainment system 104 communicates with a mobile device 106 carried by a user 108. For example, user 108 may be an owner of vehicle 102 or an occupant who will be driving or riding in vehicle 102. Mobile device 106 includes any type of computing device, such as a smartphone, tablet computer, laptop computer, portable entertainment device, and the like. Mobile device 106 is capable of wireless communication with entertainment system 104 when mobile device 106 is within a communication range of entertainment system 104. In some embodiments, mobile device 106 is a Bluetooth-enabled device and entertainment system 104 supports Bluetooth communications. In particular implementations, mobile device 106 is a Bluetooth Low Energy (BLE) device.

As discussed herein, entertainment system 104 is coupled to a vehicle user interface that is capable of presenting information to a driver and/or passenger of vehicle 102. In some embodiments, entertainment system 104 allows a driver or passenger of vehicle 102 to control certain features and/or applications currently available on mobile device 106. In other embodiments, entertainment system 104 controls the presentation of other visual or audio indications to the driver or passenger of vehicle 102, such as vehicle information, navigation information, and the like.

Entertainment system 104 may periodically communicate with a data communication network 112, such as the Internet or other network. For example, entertainment system 104 may communicate with a server 110 via network 112. Server 110 can access data from a database 114, which includes user profile information, mobile device information, Bluetooth address information, navigation information, vehicle drive history, and other data.

In the example embodiment 100 shown in FIG. 1, mobile device 106 is shown as communicating with one vehicle 102. In other embodiments, a particular mobile device 106 may communicate with multiple vehicles 102 if more than one vehicle 102 is in proximity to mobile device 106.

Figure 2:
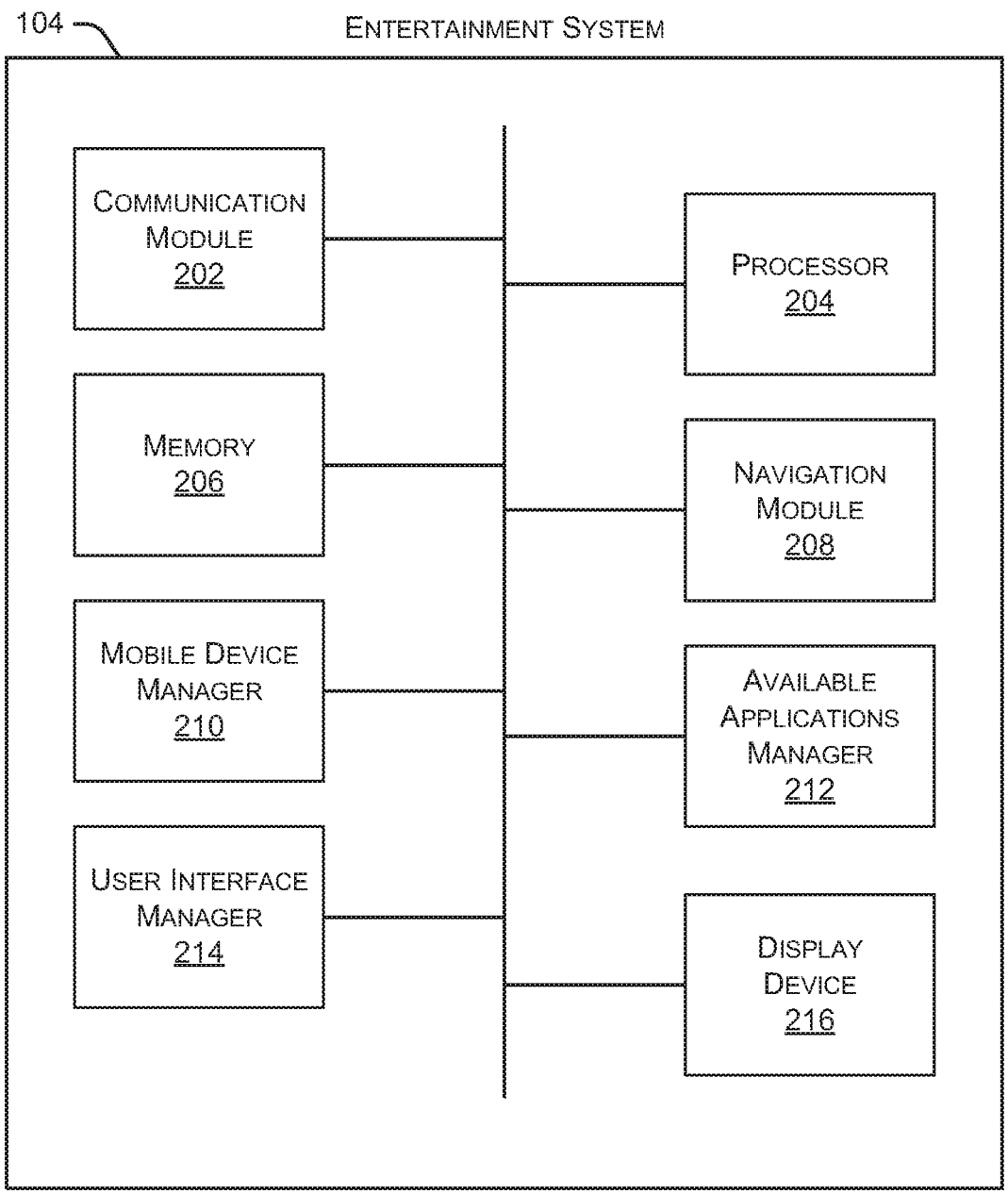
FIG. 2 is a block diagram depicting an embodiment of an entertainment system.

FIG. 2 is a block diagram depicting an embodiment of entertainment system 104. As shown in FIG. 2, entertainment system 104 includes a communication module 202, a processor 204, and a memory 206. Communication module 202 allows entertainment system 104 to communicate with other systems or components, such as mobile device 106, network 112, server 110, and the like. Additionally, communication module 202 may communicate with other systems or devices in vehicle 102 via a bus, such as a CAN (controller area network) bus. Processor 204 executes various instructions to implement the functionality provided by entertainment system 104. Processor 204 may include any type of general purpose or special purpose processor for executing program code or instructions. Memory 206 stores these instructions as well as other data used by processor 204 and other modules contained in entertainment system 104. Additionally, memory 206 may store user-specific information, such as user profile information, user communication parameters, mobile device settings, and the like.

Entertainment system 104 also includes a navigation module 208 that performs various navigation routing operations for directing vehicle 102 to a desired destination. Various techniques are available for routing vehicle 102 to its destination. Navigation module 208 may include a GPS (global positioning system) to identify the vehicle's current geographic location.

A mobile device manager 210 manages communication with one or more mobile devices. For example, mobile device manager 210 can request and/or receive information from a mobile device related to currently available applications on the mobile device. Since applications may be deleted from a mobile device by a user, the same mobile device may have different available applications at different times. Additionally, some applications may only operate in particular geographic areas or during specific situations. Mobile device manager 210 communicates with one or more mobile devices periodically to determine the currently available applications on each mobile device.

Available applications manager 212 receives information about the currently available applications from mobile device manager 210 and maintains data regarding the currently available applications on one or more mobile devices. Available applications manager 212 communicates with user interface manager 214 to determine specific features, applications, and other information to display on a display device 216 in the vehicle. For example, if a navigation application on a mobile device is currently available, the mobile device will indicate the availability of that application to mobile device manager 210, which communicates that availability information to available applications manager 212. User interface manager 214 determines how to display the navigation application (and its features) on display device 216 such that a user (e.g., a vehicle driver or passenger) can control the mobile device's navigation application (and its features) through entertainment system 104. In addition to displaying the navigation application (and its features), the display device may also display other vehicle data, features, and applications, such as entertainment features, vehicle settings, navigation features, climate control settings, and the like.

Figure 3:
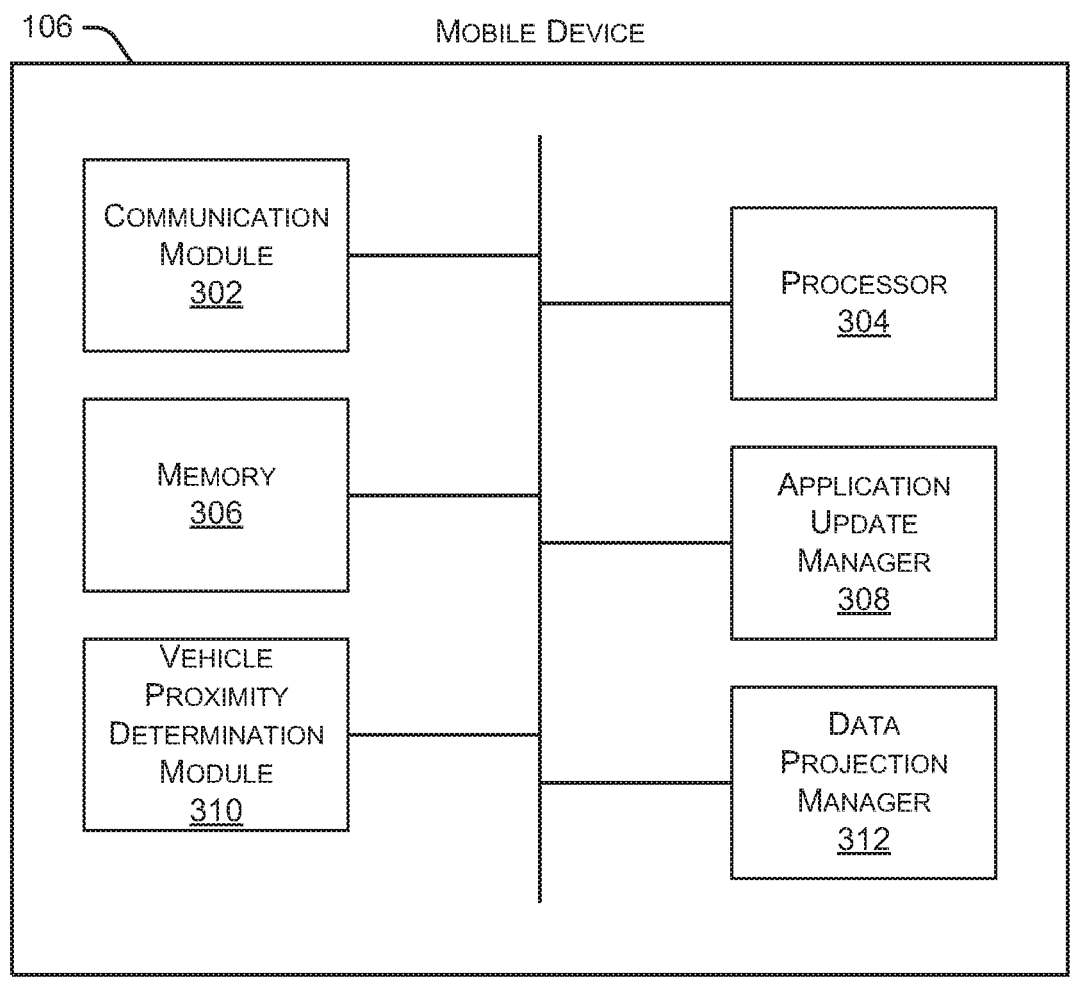
FIG. 3 is a block diagram depicting an embodiment of a mobile device carried by a driver or passenger of a vehicle.

FIG. 3 is a block diagram depicting an embodiment of a mobile device 106 carried by a driver or passenger of a vehicle. As shown in FIG. 3, mobile device 106 includes a communication module 302, a processor 304, and a memory 306. Communication module 302 allows mobile device 106 to communicate with other systems or components, such as entertainment system 104 or other vehicle systems. Processor 304 executes various instructions to implement the functionality provided by mobile device 106. Processor 304 may include any type of general purpose or special purpose processor for executing program code or instructions. Memory 306 stores these instructions as well as other data used by processor 304 and other modules contained in mobile device 106. Additionally, memory 306 may store other information, such as communication parameters and the like.

Mobile device 106 also includes an application update manager 308 that periodically communicates with one or more entertainment systems 104 to send information about currently available applications on the mobile device. A vehicle proximity determination module 310 senses when mobile device 106 is within a predetermined distance of a vehicle. In some embodiments, when the predetermined distance is reached, a data projection manager 312 communicates (e.g., via communication module 302) information about currently available applications on mobile device 106 to the vehicle (e.g., the vehicle's entertainment system 104). In particular implementations, a projection technology, such as Apple CarPlay or Android Auto is used to communicate information about currently available applications on mobile device 106 to the vehicle. For example, if a user disables (or deletes) a Map application from mobile device 106, that update is sent from mobile device 106 to entertainment system 104 using a supported projection technology.

Figure 4:
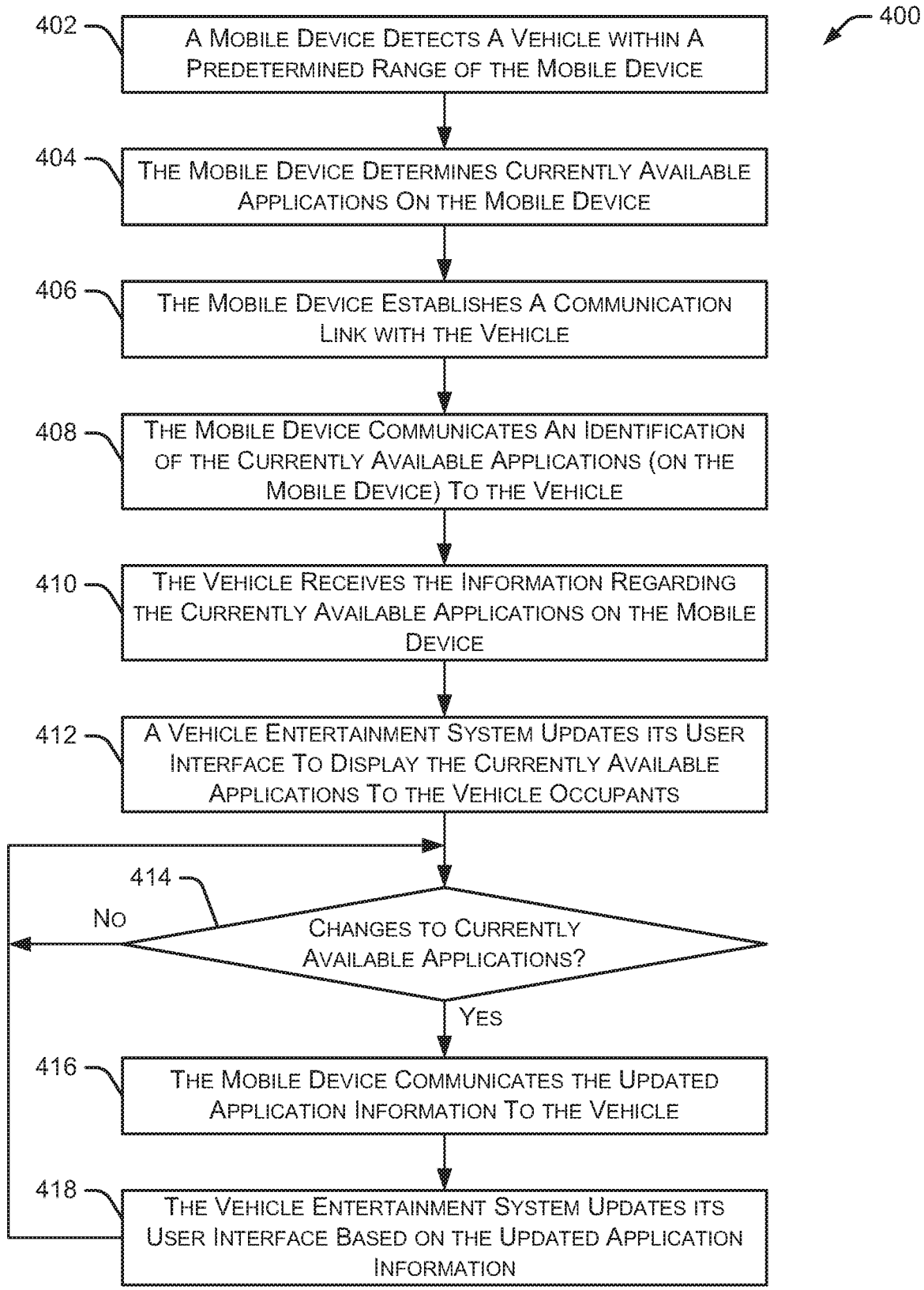
FIG. 4 is a flow diagram depicting an embodiment of a method for determining currently available applications on a mobile device and updating a user interface of a vehicle entertainment system based on the currently available applications.

FIG. 4 is a flow diagram depicting an embodiment of a method 400 for determining currently available applications on a mobile device and updating a user interface of a vehicle entertainment system based on the currently available applications. Initially, a mobile device detects a vehicle within a predetermined range of the mobile device at 402. For example, the predetermined range may be within 0-25 feed of the vehicle. The mobile device then determines the currently available applications on the mobile device 404. The currently available applications include, for example, applications that are installed on the mobile device and active on the mobile device (i.e., not deleted from the mobile device or deactivated/disabled). The mobile device establishes a communication link with the vehicle at 406. The mobile device then communicates an identification of the currently available applications (on the mobile device) to the vehicle at 408. As discussed herein, the identification of the currently available applications may be communicated to the vehicle using a projection technology, such as Apple CarPlay or Android auto. Various types of message formats may be used to communicate data regarding the currently available applications to the vehicle. In some embodiments, the message format is a property list, a text file, or a call-and-response query. For example, using a call-and-response query, the vehicle entertainment system queries the mobile device regarding a particular application (such as a navigation application). If the particular application is currently available on the mobile device, then the mobile device responds to the query with a "1". Otherwise, the mobile device responds to the query with a "0", indicating that the particular application is not currently available on the mobile device.

The vehicle receives the information regarding the currently available applications on the mobile device at 410. The vehicle's entertainment system (or any other vehicle system) updates its user interface to display the currently available applications to the vehicle occupants at 412. The method 400 then periodically determines whether there are any changes to the currently available applications at 414. In some embodiments, the vehicle entertainment system may periodically query the mobile device to see if there are any changes to the available applications since the last update. In other embodiments, the mobile device may automatically notify the vehicle entertainment system each time a change occurs to the available applications on the mobile device (e.g., each time a new application is added/activated or removed/deactivated). If there are no changes to the available applications, the method waits a particular time period before checking again. If there is a change in the available applications, the mobile device communicates the updated application information to the vehicle at 416. The vehicle entertainment system then updates its user interface based on the updated application information at 418.

Figure 5:
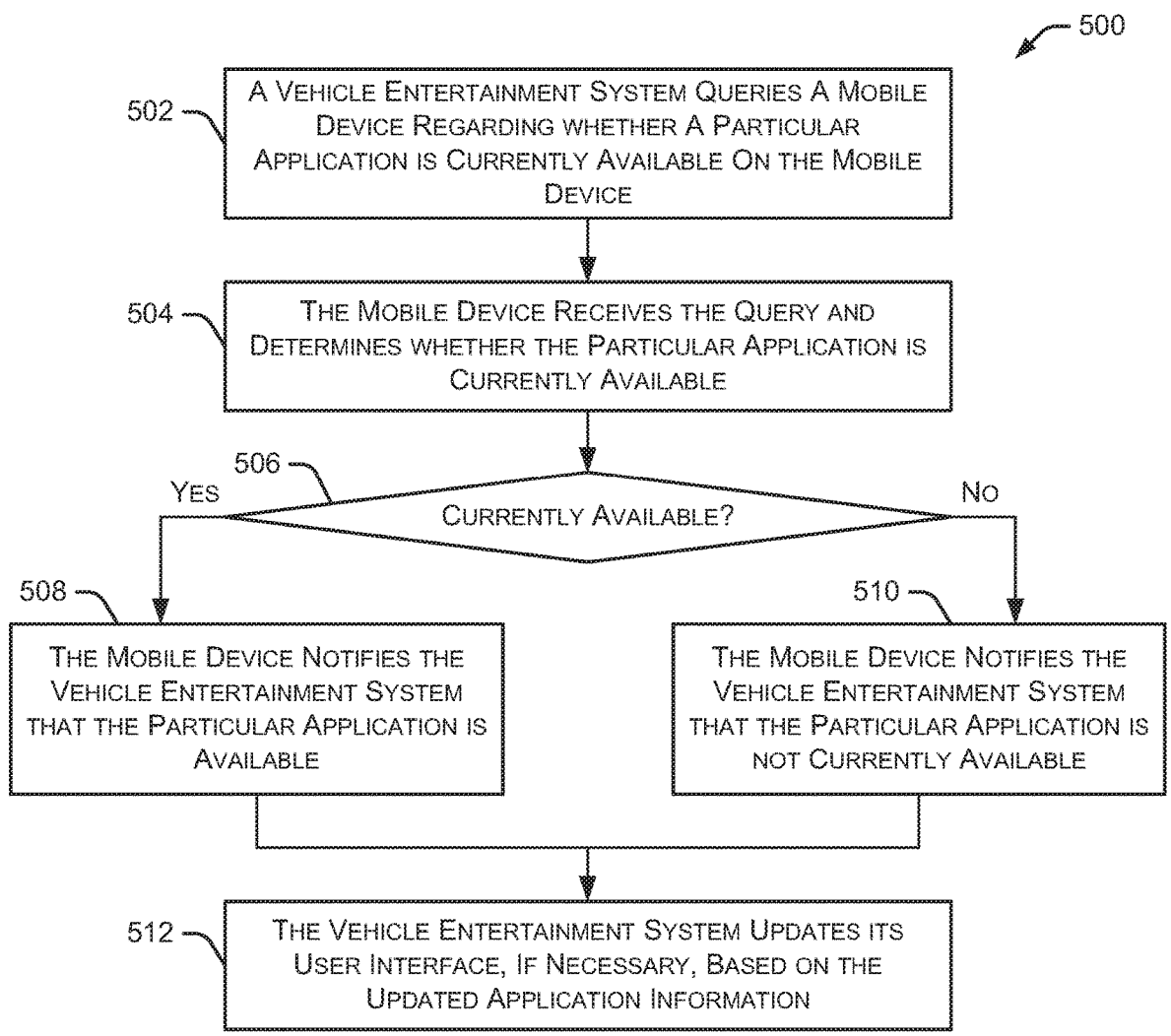
FIG. 5 is a flow diagram depicting an embodiment of a method for determining whether the currently available applications on a mobile device have changed and updating a user interface of a vehicle entertainment system, as needed.

FIG. 5 is a flow diagram depicting an embodiment of a method 500 for determining whether the currently available applications on a mobile device have changed and updating a user interface of a vehicle entertainment system, as needed. Initially, a vehicle entertainment system queries a mobile device regarding whether a particular application is currently available on the mobile device at 502. The mobile device receives the query and determines whether the particular application is currently available at 504. If the particular application is currently available at 506, the mobile device notifies the vehicle entertainment system that the particular application is currently available at 508. However, if the particular application is not currently available at 506, the mobile device notifies the vehicle entertainment system that the particular application is not currently available at 510. The method continues as the vehicle entertainment system updates its user interface, if necessary, based on the updated application information at 512. For example, if the particular application was previously available, but now the application is not available, the vehicle entertainment system updates its user interface to indicate that the application is no longer available.

In some embodiments, method 500 is repeated for each possible application that might be available on the mobile device.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:
1. A method comprising:
  a vehicle entertainment system establishing a communication link with a mobile device proximate the vehicle;
    (a) the vehicle entertainment system receiving, from the mobile device, an identification of currently available applications on the mobile device;

(b) the vehicle entertainment system updating an in-vehicle user interface to display the currently available applications on the mobile device to at least one occupant of the vehicle;
(c) subsequent to performing (a) and (b), transmitting a query to the mobile device regarding availability of a first application of the currently available applications;
(d) receiving a response to the query indicating that the first application is not available; and
(e) in response to (d), updating the in-vehicle user interface to remove reference to the first application.

2. The method of claim 1, further comprising the in-vehicle user interface displaying vehicle-based applications currently available through the vehicle entertainment system.

3. The method of claim 1, wherein the identification of currently available applications is received from the mobile device using a projection technology.

4. The method of claim 1, wherein the communication link is a wireless communication link.

5. The method of claim 1, wherein the vehicle entertainment system automatically establishes the communication link with the mobile device when the mobile device is a predetermined distance from the vehicle.

6. The method of claim 1, further comprising the vehicle entertainment system requesting approval from the mobile device to display all currently available applications to the at least one occupant of the vehicle.

7. The method of claim 1, further comprising the vehicle entertainment system receiving, from the mobile device, an identification of which currently available applications can be displayed to the at least one occupant of the vehicle.

8. The method of claim 1, further comprising the vehicle entertainment system periodically performing (c).

9. The method of claim 8, further comprising:
(f) subsequent to performing (a) and (b), transmitting a query to the mobile device regarding availability of a second application not included in the currently available applications;
(g) receiving a response to the query indicating that the second application is available; and
(h) in response to (g), updating the in-vehicle user interface to include a reference to the second application.

10. The method of claim 1, further comprising the vehicle entertainment system querying the mobile device to determine whether a particular application is currently available on the mobile device.

11. A method comprising:
a vehicle entertainment system establishing a communication link with a mobile device proximate the vehicle;
the vehicle entertainment system querying the mobile device to determine whether a particular application is currently available on the mobile device,
the vehicle entertainment system receiving, from the mobile device, an identification of whether the particular application is currently available on the mobile device using a projection technology;
(a) the vehicle entertainment system updating an in-vehicle user interface to display the particular application responsive to receiving an identification that the particular application is currently available on the mobile device;
subsequent to (a), the vehicle entertainment system querying the mobile device at periodic intervals to determine whether the particular application is still available on the mobile device;
the vehicle entertainment system receiving, from the mobile device, an identification of whether the particular application is still available on the mobile device; and
the vehicle entertainment system updating an in-vehicle user interface to remove the particular application responsive to receiving an identification that the particular application is not currently available on the mobile device.

12. The method of claim 11, further comprising the in-vehicle user interface displaying vehicle-based applications currently available through the vehicle entertainment system.

13. The method of claim 11, further comprising:
the vehicle entertainment system querying the mobile device to determine whether a second application is currently available on the mobile device;
the vehicle entertainment system receiving, from the mobile device, an identification of whether the second application is currently available on the mobile device; and
the vehicle entertainment system updating an in-vehicle user interface to display the second application responsive to receiving an identification that the second application is currently available on the mobile device.

14. The method of claim 11, wherein the communication link is a wireless communication link.

15. The method of claim 11, wherein the vehicle entertainment system automatically establishes the communication link with the mobile device when the mobile device is a predetermined distance from the vehicle.

16. The method of claim 11, further comprising the vehicle entertainment system periodically querying the mobile device to identify any changes to the currently available applications on the mobile device.

17. The method of claim 16, further comprising the vehicle entertainment system updating the in-vehicle user interface to display the updated currently available applications on the mobile device.

18. A vehicle comprising:
a communication module configured to establish a communication link with a mobile device proximate the vehicle, the communication module further configured to receive an identification of currently available applications on the mobile device;
a display device configured to display a listing of the currently available applications on a display device of an in-vehicle user interface;
a user interface manager configured to periodically for each application in a list of possible applications—
query the mobile device with respect to the each application;
if a response to the query indicates that each application is no longer available and the each application was among in the listing of currently available applications, remove the reference to the each application from the display device; and
if a response to the query indicates that the each application is now available and the each application is not in currently in the listing of currently available applications, adding the each application to the listing of currently available applications and displaying the each application on the display device.

* * * * *